United States Patent Office 3,078,736
Patented Feb. 26, 1963

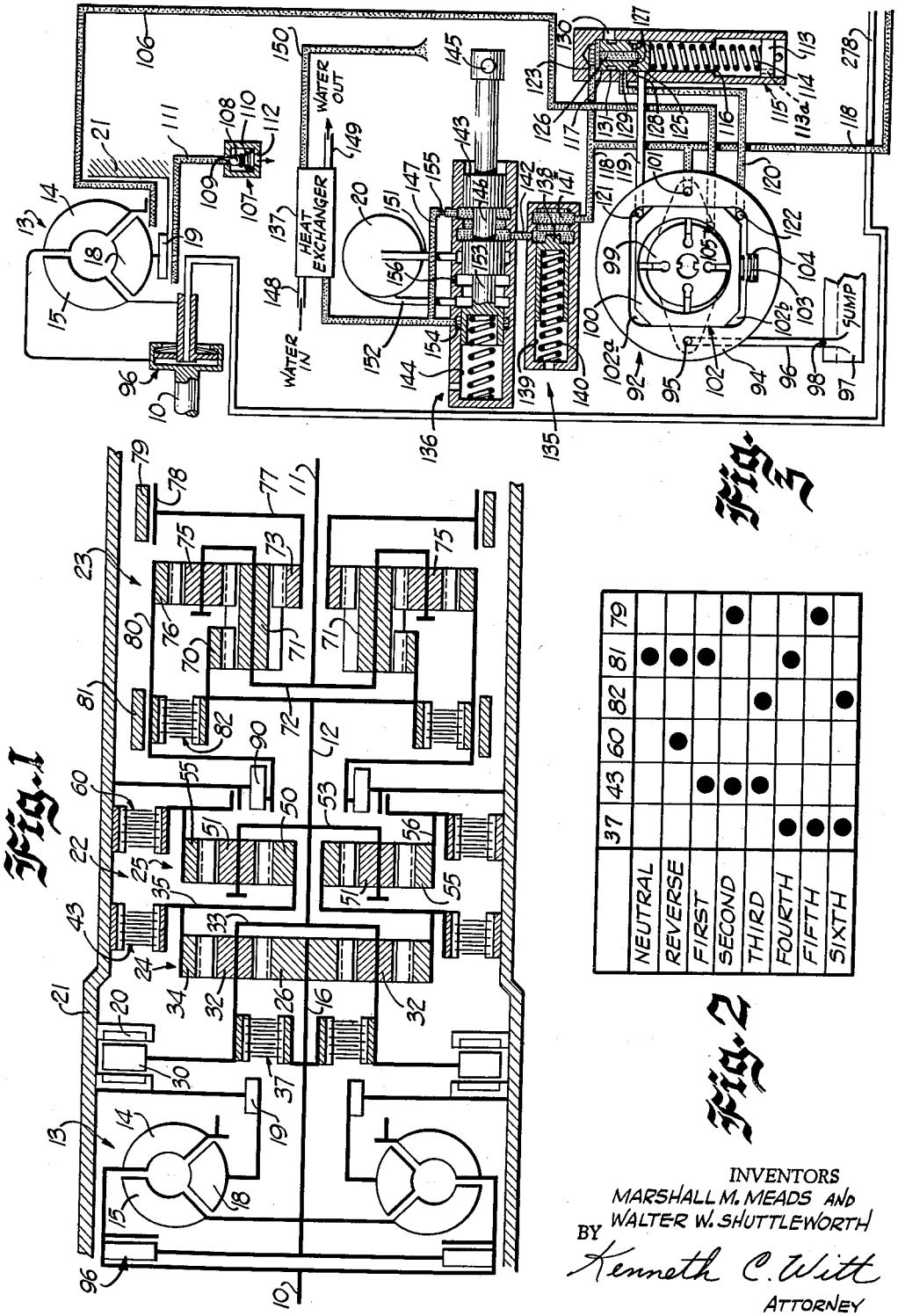

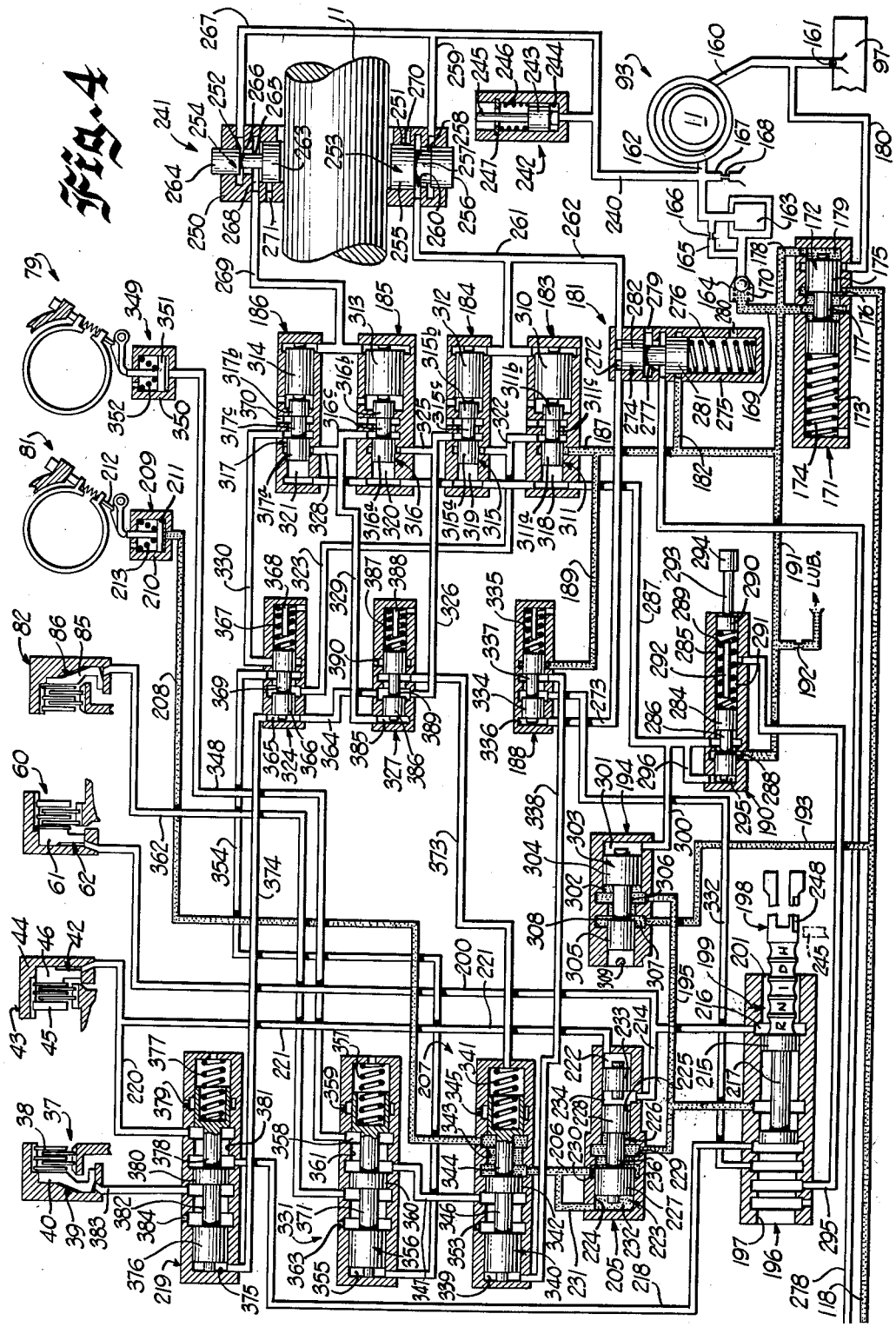

3,078,736
HYDRAULIC CONTROL SYSTEM FOR
AUTOMATIC TRANSMISSION
Marshall M. Meads, Utica, and Walter W. Shuttleworth, Jackson, Mich., assignors to Clark Equipment Company, a corporation of Michigan
Filed Dec. 19, 1960, Ser. No. 76,662
8 Claims. (Cl. 74—472)

This invention relates generally to multiple speed transmissions and is more particularly concerned with a new and improved hydraulic control system for effecting automatic shifts between different speed ratios in multiple speed transmisisons of the type used on trucks or other similar heavy vehicles.

In automatic transmissions providing a number of different speed ratios, it is customary to use a hydraulic control system for controlling the fluid flow to different servo devices which are rendered effective in sequence in order to make the successive shifts from one speed ratio to the next. Usually the control system includes one or more valves jointly sensitive to a first fluid pressure varying in accordance with vehicle speed and to a second fluid pressure varying in accordance with load or throttle position. One of the principal problems encountered in such transmissions is that of providing smooth, yet positive, shifting action in making the transition from one speed ratio to another. In many transmissions and particularly in those adapted for use upon trucks or other similar heavy vehicles, a smooth transition between speed ratios is difficult to achieve because of hunting which occurs while an attempt is being made to effect one or more of the transitions. This hunting may be caused by a number of factors which affect the pressure conditions existing in the system but, among the more important of these factors, are the large volume demands of the servo devices which often cause sharp pressure decreases during the shift, the inability to maintain the two fluid pressures to the pressure sensitive valve or valves within the range required for effective shifting and the use of highly sensitive valves or other devices which respond to very small changes in system pressure. Regardless of the cause, however, hunting is a very serious problem since it causes the vehicle to behave very poorly as the transmission shifts back and forth between two different speed ratios.

It is an object of the present invention to provide a control system which is substantially free of hunting.

A further object of the invention is to provide a transmission control system employing a number of new and improved features for preventing hunting as the transmission shifts between its different speed ratios.

Another object of the invention is to provide a transmission control system which is capable of providing very smooth shifting action between the different speed ratios.

It is also an object of the invention to provide a transmission control system employing a minimum number of control valves and similar components, thereby reducing the cost and size of the transmission and, at the same time, minimizing the maintenance problems since each additional valve or other control device employed represents a possible source of trouble in operation.

Further objects and advantages of the invention reside in certain features and details of construction among which may be particularly mentioned the manner in which the torque converter is filled only when the fluid demand of the system is sufficiently low to permit the fill without causing an attendant pressure drop, the manner in which the servo devices are filled by fluid from the front pump while the control valves are operated by rear pump pressure, the construction of the rear pump system pressure regulating valve to distribute the flow from the front and rear pumps and, at the same time, to maintain the pressure to the modulator substantially constant, the construction of the pistons of the shift valves to produce a positive shifting action and, at the same time, to eliminate hunting of these valves, the particular manner in which the shift valves are connected in the circuit to minimize problems which might be caused by sticking valves, the particular circuit arrangement permitting the use of a minimum number of control valves, the circuit including the high range cushioner valve for reducing the fluid pressure used in applying the servo devices when establishing the higher speed ratios, and the construction of the servo regulator valve and the high range cushioner valve to provide a very rapid response and recovery of these valves in order to maintain the fluid pressure delivered to the applied servo devices.

The invention, both as to its organization and manner of operation, together with further objects and advantages will best be understood by reference to the following detailed description taken in conjunction with the accompanying drawings wherein:

FIG. 1 is a schematic view showing a change speed gearing with which the control system of the present invention may be used;

FIG. 2 is a table showing the various control elements which are energized in the transmisison shown in FIG. 1 in order to establish the reverse drive, neutral and six different forward speed ratios;

FIG. 3 is a schematic diagram showing a portion of the control circuit of the present invention and illustrates particularly the front pump, the circuits for filling the torque converter, and the circuits for applying the hydrodynamic brake or fluid retarder; and FIG. 4 is a schematic diagram which, when laid alongside and to the right of FIG. 3, completes the hydraulic control circuit of the present invention.

THE GEARING

Referring now to the drawings and more particularly to FIG. 1 thereof, the transmission there illustrated is described in detail in Patent 2,929,271, Miller, dated March 22, 1960. While many of the features of the control system of the present invention will obviously be useful in conjunction with transmissions differing from that shown in FIG. 1, in order to provide a complete understanding of the present invention, a brief description of the gearing follows although, for a better understanding of this transmission, reference may be taken to the Miller patent referred to above. In the transmission illustrated in FIG. 1, drive is transferred from an engine shaft 10 driven by the engine of the vehicle to an output shaft 11 which is adapted to be connected through conventional differential gearing and other suitable connecting means to the wheels of the vehicle. An intermediate shaft 12 is axially aligned with and disposed between the shafts 10 and 11 and cooperates with the gearing to control the transfer of drive between the engine shaft and the output shaft. The shaft 10 may be connected to drive the impeller 14 of a conventionl torque converter or other fluid coupling 13. This torque converter has its turbine 15 connected to drive an input shaft 16 and has its reaction blades 18 connected through a one way clutch 19 of conventional construction to a transmission casing 21 enclosing the change speed gearing. The casing 21 also houses a fluid retarder or hydrodynamic brake 20 which may be selectively actuated in a manner described more fully below to slow down the vehicle under certain driving conditions.

The change speed gearing within the casing 21 comprises a pair of gear groups 22 and 23 connected in tandem between the input shaft 16 and the output shaft 11, with the gear group 22 consisting of a pair of simple, single pinion type planetary gear sets respectively indicated by reference numerals 24 and 25 and the output gear group 23 comprising a compound, double pinion type planetary gear set. The planetary gear set 24 includes an input sun gear 26 splined to the shaft 16 and meshing with a plurality of planet pinions 32 rotatably mounted equal distances apart upon a planet carrier 33. The pinions 32, which are preferably three in number, mesh with a ring gear 34 formed on a member 35 disposed between the gear sets 24 and 25.

To lock up the gear group 22 in order to provide a direct drive from the input shaft 16 to the intermediate shaft 12, there is provided a friction device which may take the form of a multiple disc clutch 37 of conventional construction operable to interconnect the sun gear 26 and the planet carrier 33. To this end, the clutch includes sets of clutch plates disposed between an annular backing plate 38 (shown in FIG. 4) and an annular piston 40 longitudinally movable within the clutch housing. Suitable biasing springs, not shown, act against the piston 40 to urge it to the left as viewed in FIG. 4 so that the plates of the clutch 37 are normally disengaged. Admission of fluid to a clutch chamber 39 formed between the clutch housing and the piston 40 moves the piston to the right as viewed in FIG. 4 to compress the biasing springs and to move the clutch plate into frictional engagement, thereby connecting the planet carrier 33 and the sun gear 26 and providing a direct drive from the input shaft 16 to the intermediate shaft 12. In this connection, it should be understood that the planet carrier 33 is splined to the intermediate shaft.

A second multiple disc friction clutch 43, similar in construction to the clutch 37, is provided for the purpose of holding the ring gear 34 stationary to provide a speed reduction through the input gear group 22. To this end, the clutch 43 includes clutch plates disposed within a housing 44 and positioned between an annular backing plate 45 and a piston 46 longitudinally movable within the housing. Here again, one or more biasing springs are provided for normally urging the piston 46 to the right as viewed in FIG. 4 so that the plates of the clutch 43 are normally disengaged. Admission of fluid to a clutch chamber 42 defined within the housing 44 moves the piston 46 to the left as viewed in FIG. 4 to compress the biasing springs and to urge the clutch plates into engagement, thereby connecting the ring gear 34 to the casing 21 in order to hold this ring gear stationary and provide torque reaction for the gear group 22.

The gear set 25 includes a sun gear 50 formed on the member 35 and meshing with a plurality of equidistantly spaced planet pinions 51 rotatably supported upon a planet carrier 53. The carrier 53 is splined to the intermediate shaft 12 and, hence, cooperates with the carrier 33 to provide drive for the output gear set 23. The planet pinions 51 also mesh with a ring gear 55 which is formed upon an annular drum 56 attached to one set of clutch plates of a multiple disc friction clutch indicated generally by the reference numeral 60.

The clutch 60 includes clutch plates which when moved into engagement are effective to connect the ring gear 55 to the casing 21 in order to provide reverse drive to the intermediate shaft 12. The clutch plates are moved into frictional engagement by supplying fluid under pressure to a chamber 62 formed adjacent to piston 61 which may be moved to the right as viewed in FIG. 4 to force the clutch plates into engagement. Here again, the clutch plates are normally maintained in disengaged condition by suitable biasing springs acting upon the piston 61.

The output gear group 23 includes a ring gear 70 secured to the intermediate shaft 12 and meshing with a plurality of elongated planet pinions 71 rotatably supported upon a planet carrier 72. The planet carrier 72 is splined to the output shaft 11 and, hence, functions to complete the drive to the latter shaft. The planet pinions 71 mesh with a sun gear 73 and with a plurality of relatively short pinions 75, preferably three in number, rotatably supported upon the planet carrier 72. The pinions 75 further mesh with a ring gear 76 formed upon an elongated brake drum 80 surrounding the output gear group 23. An integral extension 77 formed on the sun gear 73 terminates in a brake drum 78 which is adapted to be engaged and held stationary by means of a band brake 79 which, when applied, provides a minor speed reduction in the gear group 23. In similar manner, the elongated drum 80 is adapted to be engaged and held stationary by a band brake 81 for the purpose of providing major speed reduction in the output gear group 23. A one way clutch 90 may be provided, as fully described in the above identified copending Miller application, for holding the ring gear 76 in order to reduce the timing requirements of the automatic control system in making the transition from the third forward speed ratio to the fourth ratio.

In order to bypass the torque converter 13 in those speed ratios where the torque converter is not used, there is provided a lock-up clutch indicated generally by the reference numeral 96. This lock-up clutch may take any of the forms well known in this art and functions to provide a direct connection from the engine shaft 10 to the input shaft 16 in order to bypass the torque converter 13. It is generally desirable to bypass the torque converter at the higher speed ratios in order to improve the efficiency of the transmission and to reduce the fuel consumption. The manner in which the clutch 96 is energized to perform this result is described more fully below.

In the form of the invention illustrated in FIGS. 1 and 2, the transmission is adapted to provide a neutral condition, six forward speed drive ratios and a single reverse drive. As will be apparent from a study of the table shown in FIG. 2, in the neutral condition all four of the clutches 37, 43, 60 and 82 are disengaged while the band brake 81 is applied. However, since none of the control elements of the input gear group 22 is applied to assume the torque reaction, drive cannot be transferred from the input shaft 16 to the intermediate shaft 12 and, as a result, the output shaft 11 is not driven. The first forward speed ratio is established by simultaneously applying the clutch 43 and the brake 81 thereby effecting major speed reduction in both the input gear group 22 and the output gear group 23. The second forward speed ratio is obtained by releasing the band brake 81 and applying the band brake 79 while holding the clutch 43 applied. Application of the brake 79 places the output gear group 23 in minor speed reduction while the input gear group 22 remains in major speed reduction. The third forward speed ratio is obtained by releasing the brake 79 and actuating the clutch 82 while, at the same time, holding the clutch 43 applied. With the clutch 82 applied, the output gear group 23 is locked up for direct drive while the input gear group 22 obviously remains in major reduction.

To establish the fourth forward speed ratio, the clutches 43 and 82 are both released and the brake 81 and the clutch 37 are applied. When the clutches 43 and 82 are released the torque passing from the engine shaft 10 to the output shaft 11 is temporarily interrupted and the engine shaft may tend to speed up. If this speed up reaches a predetermined point, the overrunning clutch 90 becomes effective to lock the ring gear 76 to the transmission casing thereby assuming the torque reaction until the brake 81 and the clutch 37 become effective. As indicated in the above identified Miller patent, the overrunning clutch 90 can be eliminated by timing the transmission control circuit so that the brake 81 and the clutch 37 become effective instantaneously upon the release of the clutches 43 and 82 but, since this timing requirement is rather delicate, the overrunning clutch 90 may be employed so that the timing requirements will not be quite so severe. When the brake 81 is applied, it, of course, takes over the function of the overrunning clutch 90 and holds the ring gear 76 stationary in order to provide major speed reduction in the output gear group 23. Application of the clutch 37, of course, locks the input shaft 16 to the intermediate shaft 12 thereby providing a direct drive to the output gear group 23.

The fifth forward speed drive is established by releasing the brake 81 and applying the band brake 79 while, at the same time, maintaining the clutch 37 applied. With the brake 79 applied, the output planetary gear group 23 is in minor speed reduction while the input gearing 22 obviously remains in direct drive. The sixth forward speed drive ratio is obtained by releasing the brake 79 and applying the clutch 82 while maintaining the clutch 37 in energized condition. With the clutch 82 applied, the ring gears 70 and 76 of the gear set 23 are connected directly together and the gear group 23 is, therefore, locked for direct drive. Since the clutch 37 continues to provide direct drive from the shaft 16 to the intermediate shaft 12, it will be understood that a direct drive is provided to the output shaft 11.

The reverse drive is effected by simultaneously applying the clutch 60 and the band brake 81. As indicated above, major speed reduction is established in the output gear group 23 when the band brake 81 is applied while the clutch 60 functions to hold the ring gear 55 stationary, thereby cooperating with the brake 81 to provide a reverse drive at reduced speed to the output shaft 11.

THE FRONT PUMP

The transmission casing 21 also encloses front and rear pumps 92 and 93 respectively shown in FIGS. 3 and 4 which perform the functions of pressurizing and feeding oil to the torque converter 13, providing lubrication for the transmission gearing, cooling the friction brakes and clutches, if necessary, and providing fluid pressure for operating the automatic control system to engage the friction brakes and clutches in the manner described below. The front pump 92 includes a pump body 94 having a fluid inlet 95 connected through a suitable conduit or passage 96 to a tank or reservoir 97 formed on the bottom of the transmission casing 21 but not shown in FIG. 1. A suitable fluid such as oil is passed from the tank 97 through a screen 98 in order to remove foreign particles which might otherwise interfere with the operation of the various valves in the control system. The front pump 92 is of the positive displacement constant pressure type but the displacement is variable to supply sufficient fluid to an outlet port 101 to meet the demands of the system. To this end, the pump 92 includes a pair of pumping elements 99 and 100, with the pumping element 99 being driven from the impeller 14 of the torque converter which is, in turn, connected to the engine shaft 10. The pumping element 100 is disposed within a pump chamber 102 formed in the pump body 94 and is mounted for sliding movement within this chamber for the purpose of adjusting the eccentricity of the pump in order to alter the pump displacement and, hence, to satisfy all volume and pressure requirements of the control system.

TORQUE CONVERTER FILL

A priming spring 103 partially disposed within a recess 104 formed in the pump body 94 normally urges the sliding plate or pumping element 100 toward the top of the chamber 102 as viewed in FIG. 3 in order to bias this pump element toward full eccentricity to effect maximum volume output from the front pump when the vehicle is starting, thereby to filll any drained lines in the control system, ultimately to supply fluid to the torque converter 13, to lubricate the gearing, and to fill the control elements or cylinders of the servo devices controlling the application of the various clutches and brakes described above. To this end, the front pump 92 includes an eyebrow opening 105 for delivering a restricted amount of oil through a fluid line 106 to fill the torque converter 13. Whenever the pumping element 100 is moved to its full eccentricity position so that the front pump is being called upon to supply maximum volume requirements for the system, the eyebrow opening 105 is closed to prevent the torque converter from diverting any of the fluid from the system and, as a result, the full volume output of the front pump is available to meet the increased fluid demand. During normal pump operation when the pumping element 100 is not in its full eccentricity position, the eyebrow opening 105 is open to allow normal flow of oil through the line 106 to the torque converter in order to prevent cavitation and overheating of the torque converter 13.

For the purpose of maintaining the fluid in the torque converter 13 there is provided a torque converter pressure regulating valve indicated generally by the reference numeral 107. This valve may take the form of a conventional ball check valve including a ball 108 seated against a valve seat 109 by means of a biasing spring 110 so that the ball remains seated to close the fluid output line 111 from the torque converter until the pressure of the fluid within the converter is sufficient to overcome the biasing spring 110. The valve 107 also serves as a safety release valve to prevent excessive fluid pressure in the torque converter since any excess pressure will result in unseating the ball 108 to provide a path from the line 111 to the sump 97 through a passage 112. The valve 107 must be located below the oil level in the sump 97 in order to prevent draining of the torque converter by the admission of air through this valve when the ball 108 is unseated or if the seal which this valve provides is defective or ineffectual for any reason.

FRONT PUMP REGULATOR VALVE

The eccentricity of the front pump 92 is automatically controlled by a front pump pressure regulating valve 115 which is actually formed in the pump body 94 but, for purposes of illustration, is indicated in FIG. 3 as a separate element. The valve 115 includes a valve cylinder or bore 116 having a valve piston 117 slidably mounted therein for the purpose of controlling fluid flow from a line 118 to a pair of lines 119 and 120 respectively connected to ports 121 and 122 opening to the pump chamber 102. More specifically, the line 118 is connected to the outlet port 101 of the front pump 92 and delivers oil through a port 123 to the upper end of the cylinder 116 as viewed in FIG. 3. The pumping element or sliding plate 100 of the front pump effectively divides the pump chamber 102 into upper and lower chambers 102a and 102b which are respectively connected to the ports 121 and 122. The piston 117 is normally urged toward the upper end of the cylinder 116 by means of a biasing spring 114 acting between the lower end of the piston and a fixed cap or disc 113 seated within the cylinder 116.

If the pressure in the line 118 tends to increase, a condition which might occur, for example, when the fluid demand of the control system decreases, the piston 117 is urged downwardly within the cylinder 116 so that a land 125 on this piston uncovers the fluid passage 119 to deliver fluid under pressure from the port 123 through an axial passage 126 formed in the piston and through one or more radial passages 127 in the piston to an annular groove 128 formed in the periphery of the piston. Admission of fluid under pressure from the groove 128 through the line 119 and through the port 121 to the upper section 102a of the pump chamber forces the pumping element 100 downwardly against the priming spring 103 to decrease the output of the front pump 92 by decreasing the eccentricity of the elements 99 and 100. Fluid in the chamber section 102b is forced by the downward movemnet of element 100 through port 122, through line 120 and through an annular groove 131 defined in the periphery of the valve piston 117 to a vent port 130.

In similar manner, if the pressure in the line 118 should tend to decrease in response to an increase in fluid demand by the control system, the biasing spring 114 acts to move the piston 117 upwardly within the cylinder 116 until a land 129 on the piston uncovers the fluid passage 120 whereupon fluid under pressure is delivered from port 123 through the axial passage 126 and through the passages 127 to the annular groove 128. The fluid under pressure passes from the groove 128 through the passage 120 and through the port 122 to the lower chamber section 102b so that the pumping element 100 is moved upwardly within the pump chamber to increase the eccentricity of the front pump and, hence, to increase the output. In view of the foregoing description, it will be observed that the pressure regulating valve 115 cooperates with the front pump 92 to maintain the pressure in the line 118 at substantially constant value, and in accordance with one embodiment of the present invention, a pressure of 200 lbs. per square inch was found to provide very satisfactory results. Fluid in the upper chamber section 102a is forced by the upward movement of the pumping element 100 through port 121 and through line 119 to the sump 97 through the lower end of the valve cylinder 116 by way of aperture 113a in cap 113. Any excess fluid in the line 118 is diverted to the sump 97 through the port 130 whenever the valve piston 117 is moved downwardly by a sufficient amount to uncover the latter port.

THE HYDRODYNAMIC BRAKE 20

A fluid retarder or hydrodynamic brake of the type indicated generally by the reference character 20 has been used heretofore on transmissions for trucks or other heavy duty vehicles for the purpose of providing a braking action to slow down the vehicle as, for example, when descending a relatively steep grade. The brake 20 is normally empty of fluid and is adapted to be filled by the selective operation of a manual control located in the driver's compartment of the vehicle. When the brake 20 is filled with fluid, it provides a load on the front gear group 22 to slow down the vehicle in a manner which will be evident to those skilled in this art. The circuit for filling the hydrodynamic brake 20 is shown in FIG. 3 and includes a limit valve indicated generally by the reference numeral 135 and a manually operated brake control valve 136. The valve 135 functions to interrupt the delivery of oil from the line 118 to the hydrodynamic brake 20 and to a heat exchanger unit 137 whenever the fluid demand is such that the front pump does not have sufficient capacity to supply the control system. More specifically, the valve 135 includes a piston 138 mounted for sliding movement within a valve bore 139 and is biased toward its closed or fluid interrupting position by means of a biasing spring 140. As long as the fluid in the line 118 is maintained at full line pressure in the vicinity of 200 lbs. per square inch, this fluid enters a chamber 141 in the valve bore 139 and functions to maintain the piston 138 in the open position shown, thus compressing the spring 140. The fluid in the chamber 141 then passes through a passage 142 to the brake control valve 136. The latter valve includes a manually operable piston 143 mounted for sliding movement within a valve bore 144. The extreme outer end 145 of the piston is connected through a suitable mechanical linkage, not shown, to an operating control in the driver's compartment of the vehicle. The valve 136 is shown in its open or "brake off" position so that a very small amount of fluid from the line 142 passes to the heat exchanger unit 137, through an annular groove 146 in the piston 143 and through a fluid passage 147 having a small flow restricting orifice 155 therein. The heat exchanger 137 is located adjacent the engine of the vehicle, preferably on the bottom of the radiator for maximum use of the cooling water for the engine. The water in the coolest portion of the radiator is supplied to the heat exchanger through an inlet 148 while the outlet water from the heat exchanger emerges from an outlet 149 and is used in cooling the engine. The oil from the line 147 flows through the heat exchanger 137 and passes to the sump 97 through a fluid passage 150 so that the oil in the system is cooled and is maintained at the proper operating temperature.

The valve 136 is moved to its applied or "brake on" position through operation of the linkage connected to the end 145 of the piston 143 whenever the brake 20 is to be applied. The piston 143 is then moved to the left as viewed in FIG. 3 to connect the fluid line 142 through the annular groove 146 to a fluid passage 151 delivering inlet fluid to the hydrodynamic brake 20. When the brake 20 is filled, the vehicle is slowed down in the manner described above. The heated oil from the hydrodynamic brake 20 passes through a fluid line 152 and through an annular groove 153 in the piston 143 to a port 154 which is uncovered when the valve 136 is in the "brake on" position. The heated oil from the brake 20 thus flows from the port 154 to the heat exchanger 137 where it is cooled. When the valve 136 is in the "break off" position, the hydrodynamic brake 20 is drained through its outlet line 152 which is connected through the annular groove 153 to a vent port 156.

THE REAR PUMP

The rear pump 93 is of the positive displacement, variable pressure type and is driven by the output shaft 11 so that this pump supplies oil only when the vehicle is moving. Inlet oil to the pump 93 is supplied from the sump 97 through a fluid inlet line 160 and, here again, this fluid passes through a filtering screen 161 which functions to remove foreign particles from the oil in order to prevent improper operation of the control valves in the system. The outlet oil from the pump 93 is delivered to a line 162 which is connected through a conventional oil filter 163 to a rear pump check valve 164. A line 165 having an orifice 166 therein is connected in parallel with the filter 163 in order to bypass the oil in the event that the filter becomes clogged. The pressure drop across the orifice 166 is balanced with that across the filter 163 so that when a new filter cartridge is installed a major portion of the oil flows through the filter but, as the filter cartridge begins to clog the orifice permits the flow of progressively increasing amounts of oil. The line 162 is connected through a fluid passage 167 and through a very small orifice 168 to the oil in the sump 97 so that when the vehicle is moving in reverse and when the rear pump is being turned in a reverse direction, a small amount of oil is passed through the rear pump in order to lubricate this pump and, hence, to prevent it from running in a dry condition. When the output shaft 11 is not turning the line 167 and the orifice 168 serve to drain the rear pump and, when the output shaft is turning in the forward direction, this line and its orifice permits a small amount of oil to be diverted from the line 162 to the sump.

REAR PUMP CHECK VALVE

The rear pump check valve 164 blocks the flow of oil from the rear pump to a fluid line 169 until the rear pump is turning at a sufficient rate to deliver oil at a pressure adequate to overcome a biasing spring 170. In one embodiment of the present invention, the valve 164 opens when the pressure from the rear pump approaches 100 lbs. per square inch. The check valve 164 also functions to prevent a reverse flow of fluid through the filter 163 and also prevents reverse flow through the rear pump 93, thus preventing the rear pump from being driven as a motor by the fluid supplied to the line 169 from the front pump. As will be described more fully hereinafter, the valve 164 also prevents automatic shifting when the transmission is conditioned for reverse drive.

REAR PUMP SYSTEM REGULATOR VALVE

When the rear pump 93 is ineffective to deliver oil, that is, when the vehicle is in reverse drive or is idling so that the output shaft 11 is not rotating, the 200 p.s.i. fluid pressure in the line 118 is throttled by a rear pump pressure regulator valve 171 to develop a 100 p.s.i. pressure in the line 169. More specifically, the valve 171 includes a piston 172 mounted within a valve bore 173 and normally biased toward the right end of the bore by means of a spring 174. The piston includes a land 175 which functions to regulate the size of a port or orifice 176 connected to the line 118 and, hence, to control the pressure drop across this orifice. The reduced fluid pressure is delivered through an annular groove 177 in the valve piston 172 to the line 169 which is, in turn, connected through a line 178 to a chamber 179 formed at the right end of the bore 173 as viewed in FIG. 4. The fluid pressure in the chamber 179 acts in opposition to the biasing spring 174 and, as will be understood by those skilled in this art, the spring and piston may be so designed that the land 175 regulates the size of the orifice 176 to develop a pressure in the line 169 substantially less than that in the line 118. In one embodiment of the present invention, very satisfactory results were obtained when the valve 171 was designed to develop a pressure of 100 p.s.i. in the line 169.

When the rear pump is in operation, that is, when the vehicle begins to move forwardly with the output shaft 11 rotating in a forward direction, fluid pressure is applied through the check valve 164 to the line 169 and to the valve chamber 179 so that the valve 171 gradually closes the orifice 176 and calls upon the rear pump to supply more and more of the fluid to the line 169. As soon as the rear pump pressure reaches 100 p.s.i., the orifice 176 is completely closed so that all of the fluid in the line 169 is supplied from the rear pump. Further increase in the pressure of the rear pump fluid results in movement of the piston 172 to the left as viewed in FIG. 4 to connect the chamber 179 through a fluid line 180 leading to the input of the rear pump, thus bypassing the excess fluid.

SYSTEM VALVES

The fluid in the line 169 is delivered through a fluid line 182 to a lock-up clutch valve 181 controlling the operation of the torque converter lock-up clutch 96, through a fluid line 187 to a set of signal valves 183, 184, 185 and 186, through a fluid line 189 to a first and neutral inhibitor valve 188, and through a fluid line 191 to a modulator valve 190. A portion of the fluid in the line 191 is diverted through a flow control orifice 192 to provide lubrication for the gearing and the other moving parts of the transmission. The orifice 192 reduces the pressure of the oil delivered to the lubrication system and limits the flow of this oil to a reasonable value. The rate of flow of the oil to the lubricating system remains constant regardless of vehicle speed since, as described below, the pressure of the fluid in the lines 169, 182, 187, 189 and 191 remains constant. The fluid in the line 118 is delivered directly through a fluid passage 193 and through a servo regulator valve 194 to a fluid line 195 which is, in turn, connected to a manually operated selector valve 196.

SELECTOR VALVE

The selector valve 196 includes a valve body defining a bore 197 containing a manually operated piston 198 connected through suitable linkage to an operating lever located in the driver's compartment of the vehicle. This valve is movable into five different positions, namely, reverse, neutral, first, drive and hold. The piston 198 is illustrated in FIG. 4 in its neutral position with a groove in the valve spool indicated at "N" in alignment with an arrow pointed line 199. When the valve spool or piston 198 is moved one step to the right until the spool groove "R" is in alignment with the arrow pointed line 199, the selector valve is in the reverse position, and so on. In all positions of the selector valve except reverse, a fluid line 200 connected to the piston chamber 62 of the clutch 60 is vented through the end of the valve bore 197 as indicated by the reference numeral 201. Thus, it is impossible to apply the clutch 60 except when the manually operated selector valve 196 is moved to its reverse position.

The first position of the manually operated selector valve permits the driver to control the transmission to effect extremely difficult starts, as will be described more fully hereinafter. The drive position of the valve 196 is used for normal driving conditions and, is effective immediately to establish the second speed ratio whereupon automatic upshifting to the higher speed ratios and downshifting from these ratios is effected in a manner which will become evident as the description proceeds. The hold position of the manually operated selector valve 196 is employed when the vehicle is descending hills or when other operating conditions exist where relatively high engine speeds are desired.

NEUTRAL

Until the vehicle is moving forwardly at sufficient speed to develop fluid pressure from the rear pump 93 of sufficient value to open the check valve 164, all of the fluid pressure for operating the various control valves of the system and for applying the clutches or brakes will be supplied by the front pump 92 through the line 118. Thus, when the manually operated selector valve 196 is in neutral position shown in FIG. 4, the fluid in the line 195 passes through a high range cushioner valve 205, through a fluid line 206, through a control valve 207 for the band brake 81 and through a fluid line 208 to a servo device 209 controlling the application of the band brake 81. The servo device 209 includes a cylinder 210 housing a piston 211 connected through suitable linkage 212 to the brake 81. The piston 211 is normally biased toward the lower end of the cylinder 210 as viewed in FIG. 4 by means of a spring 213 but admission of fluid under pressure to the line 208 moves the piston 211 upwardly within the cylinder 210 and results in the application of the band brake 81 to hold the ring gear 80 stationary, thereby placing the output gear set 23 in major speed reduction. When the manually operated selector valve 196 is in its neutral position, the fluid flow to all four of the clutches 37, 43, 60 and 82 and the fluid flow to the brake 79 is interrupted so that none of the reaction elements for the front gear group 22 is applied. The absence of reaction elements in the input gear group 22, of course, prevents the transfer of drive from the engine shaft 10 to the output shaft 11 and, as a consequence, the transmission is in neutral.

REVERSE

When the manually operated selector valve 196 is moved to its reverse position, a land 215 on the valve piston 198 cooperates with the valve bore to break the vent connection from the fluid passage 200 to the vent 201 and, at the same time, fluid under pressure from the line 195 is supplied through an elongated, annular groove 217 in the piston 198 and through the line 200 to the chamber 62 of the clutch 60. As previously described, admission of fluid under pressure to the chamber 62 results in the application of the clutch 60 to provide a reverse drive to the intermediate shaft 12. The filled line 200 is also connected through line 214 to the high range cushioner valve 205 for the purpose of increasing the fluid pressure supplied to the servo device 209 in reverse drive as described more fully below.

Fluid under pressure continues to flow from the line 195 through the valves 205 and 207 and through the line 208 to the cylinder 210 in order to maintain the band brake 81 applied. As indicated above, simultaneous application of the clutch 60 and the band brake 81 establishes a reverse drive from the engine shaft 10 to the output shaft 11.

FIRST OR LOW

When the manually operated selector valve 196 is placed in its first position with the groove "1" in alignment with the arrow pointed line 199, fluid under pressure in the line 195 passes through the elongated groove 217 to a fluid passage 218 which, in turn, delivers the fluid pressure through a control valve 219 for the clutch 43 and through a fluid line 220 to the clutch chamber 42. As described above, admission of fluid under pressure to the chamber 42 actuates the clutch 43 to lock the ring gear 34 to the casing 21, thereby holding this ring gear stationary and establishing a speed reduction in the input gear group 22. At this time, fluid under pressure is again delivered from the line 195, through the valves 205 and 207 and through the line 208 to the cylinder 210 in order to apply the band brake 81, thereby establishing a major speed reduction in the output gear group 23. As described above, application of the clutch 43 and the band brake 81 establishes a low or first speed ratio between the engine shaft 10 and the output shaft 11.

HIGH RANGE CUSHIONER VALVE

Line 220 is also connected through a fluid passage 221 to the high range cushioner valve 205 for the purpose of increasing the fluid pressure holding the band brake 81 or 79 applied or clutch 82 engaged when the transmission is in its three lowest forward speed ratios, respectively. More specifically, the fluid line 221 is connected to a valve chamber 222 formed at the extreme right of a valve bore 223 of the high range cushioner valve 205. The bore 223 includes a relatively large diameter portion 224 and a somewhat smaller diameter portion 225. A piston 226 is slidably received within the bore 223 and includes a relatively large diameter portion 227 accommodated within the bore portion 224 and a somewhat smaller diameter portion 228 received within the bore portion 225. The fluid line 195 is connected to the bore through an annular groove 229 formed at the junction of the different diameter bore portions 224 and 225. The line 206 is connected to the bore 223 through an orifice 230 which, during the three highest forward speed ratios, is regulated by the large diameter portion 227 of the piston 226. The line 206 is also connected through a fluid passage 231 to a chamber 232 formed at the left side of the valve bore 223 thus supplying fluid to this chamber urging the piston 226 toward the right as viewed in FIG. 4.

The high range cushioner valve 205 further includes a second piston 233 separate from the piston 226 and slidably mounted within the small diameter portion 225 of the valve bore. On its right side, the piston 233 is exposed to the valve chamber 222 referred to above and on its left side is exposed to a fluid chamber 234 formed between the two pistons 226 and 233. Fluid is supplied to the chamber 234 from the line 214 referred to above.

As is clearly illustrated in FIG. 4, when the manually operated selector valve 196 is in neutral position, the fluid in the line 195 enters the annular groove 229 and passes through an annular groove 236 formed in the piston 226 to the port 230. The fluid under pressure is delivered from the port 230 through line 206 and through line 208 to the band brake 81 in the manner described above while a portion of this fluid pressure is returned through line 231 to the valve chamber 232. The piston 226 is thus exposed to the fluid pressure in the chamber 232 acting upon its left end and serving to urge the piston toward the right. The fluid pressure in the chamber 232 is balanced by the fluid pressure entering the valve bore 223 through the groove 229 which develops a force acting in opposition to the fluid pressure in the chamber 232 and urges the piston 226 toward the left. The magnitude of the latter force is, of course, a function of the difference in area between the piston portions 227 and 228. By proper design of the valve piston 226, the piston areas can be so selected that the fluid pressure in the line 195 is cut in half by the regulating action produced between the piston portion 227 and the groove 230 so that the fluid pressure in the line 206 is approximately one half that of the fluid pressure in the line 195. When the manually operated selector valve 196 is placed in reverse, however, the line 214 is supplied with the fluid pressure existing in line 200 and this fluid pressure is supplied to the chamber 234 to move the pistons 226 and 233 to the opposite ends of the valve bore 223. When the piston 233 is moved to the left as viewed in FIG. 4 the groove 230 is completely uncovered so that the valve 205 no longer performs its regulating function and the full pressure in the line 195 is, therefore, admitted to the line 206. Thus, the fluid pressure supplied to the band brake 81 is effectively doubled in order to prevent slipping of this brake under the heavy loads customarily encountered in reverse drive conditions.

The high range cushioner valve 205 is also rendered ineffective to perform its regulating function when the transmission is in either its first, second or third speed ratios since, for all of these ratios, fluid is supplied to the servo device applying clutch 43 and this fluid pressure is delivered through the line 221 to the valve chamber 222. At this time, of course, chamber 234 is vented through line 214, through the uncovered port 216 and through vent 201. The fluid pressure in chamber 222 is thus effective to move both of the pistons 226 and 223 to the extreme left end of the valve bore 223. Movement of the valve piston 226 to the left, of course, completely uncovers the annular groove 230 to admit full pressure from the line 195 to the line 206. Thus, when the manually operated selector valve 196 is in either the first, drive or hold positions and, whenever the transmission is in first, second or third forward speed ratios, the valve 205 no longer performs its regulating function and the fluid pressure delivered to the servo devices is effectively doubled to increase the holding action of these devices and to prevent slippage which might otherwise occur under heavy load conditions.

The valve 205 performs its regulating function in fourth, fifth and sixth speed ratios so that the pressure delivered to the band brake 81, the band brake 79 and the clutch 82 in these particular ratios is reduced. In this connection it should be observed that the torque capacity of the brakes 79 and 81 and the clutch 82 is approximately one third of that required in the lower speed ranges, and as a result, the valve 205 functions to smooth out the shifts in the higher speed ranges by reducing the fluid pressure for applying the friction elements, thereby reducing the torque capacity of these elements.

AUTOMATIC OPERATION

Turning now to the operation when the manually operated selector valve is in either the first or drive positions, as indicated previously, when the vehicle first begins its forward motion, the front pump will supply the necessary fluid pressure and volume throughout the entire transmission. Since the automatic shifts take place in response to pressure delivered by the rear pump in a manner described more fully hereinafter, the transmission will not upshift until the vehicle is moving forwardly at sufficient speed to develop rear pump pressure. The 200 p.s.i fluid pressure existing in the line 118 is reduced to 100 p.s.i. by the regulating valve 171 in the manner described above and, as a consequence, if a sudden drop in pressure occurs in the line 118 as might be caused, for example, by filling one or more of the cylinders for the servo devices applying the brakes or clutches, such a drop must exceed 100 p.s.i. before it will have any effect upon the system since any pressure drop less than this amount will be compensated for by the action of the valve 171. Therefore, the fluid pressure delivered through the line 191 to the modulator valve 190, which is the sensitive heart of the automatic control circuit, will very likely remain constant regardless of pressure drops in the system and, as a consequence, one of the most prevalent sources of hunting has been eliminated.

At this point it should be observed that the front pump fluid delivered to the line 193 is effected to fill all of the servo devices controlling the brakes and clutches while the rear pump pressure is effective to control the valve shifting to direct the fluid pressure to the proper servo devices to satisfy the speed and load conditions of the vehicle. Therefore, any drop in fluid pressure in the front pump caused by one of the servo devices or by the application of the fluid brake or retarder 20 cannot in any way affect the action of the control valve operated by rear pump pressure and, as a consequence, the possibility of hunting in this system has been substantially minimized.

REVERSE INHIBITOR BLOCKING DEVICE

As the vehicle begins to move forwardly at sufficient speed to enable the rear pump 93 to deliver oil at 100 p.s.i. pressure progressively decreasing amounts of oil are required from the front pump so that the rear pump gradually takes over the supply of pressure to the lines 169 and 191. This action continues until the rear pump supplies oil through a fluid line 240 to a governor device indicated generally by the reference numeral 241 and to a reverse inhibitor blocking device 242. The latter device includes a plunger 243 mounted within a bore 244 and including an outwardly protruding stem 245 movable from a retracted position as shown in FIG. 4 to an extended position in engagement with the piston 198. More specifically, the plunger 243 is normally biased towards the lower end of the bore 244 as viewed in FIG. 4 by a spring 246 acting between the plunger and a fixed locking ring 247 extending into the bore 244. In the retracted position, the stem 245 is retracted into the bore and is withdrawn from the path of movement of the piston 198 in the manually operated selector valve 196. When fluid of sufficient pressure to overcome the spring 246 is admitted from the line 240 to the lower end of the plunger 243, the latter is moved outwardly to compress the spring 246 and to move the stem 245 into engagement with a notch or groove 248 formed on the piston 198. Obviously, fluid pressure is supplied to the device 242 only when the selector valve 196 is in its first, drive or hold positions since the rear pump is effective to deliver fluid to the line 240 only under these conditions. The groove 248 is so dimensioned that the stem 245 will prevent inadvertent movement of the piston 198 from one of the forward drive positions (that is, first, drive or hold) to the reverse position, while, at the same time, permitting the plunger to be moved between the first position, the drive position and the hold position. Of course, as soon as the vehicle has been brought to a stop to permit the spring 246 to retract the plunger 243, the piston 198 is again freed for movement to the reverse position.

GOVERNOR DEVICE

The automatic upshifting and downshifting is accomplished by developing two hydraulic pressure signals one of which is proportional to vehicle speed and the other of which is proportional to the position of the vehicle throttle or accelerator. The signal proportional to vehicle speed is developed by the governor device 241 which includes a body member 250 driven by the output shaft 11 of the transmission and including a pair of spaced apart radially extending bores 251 and 252 respectively receiving a low speed governor piston 253 and a high speed governor piston 254. Each of these pistons is of the differential area type for regulating inlet fluid received from the rear pump 93. More specifically, the low speed governor valve 253 includes a relatively large diameter portion 255 and a somewhat smaller diameter portion 256 accommodated within the correspondingly dimensioned portions of the bore 251. The portions 255 and 256 are connected by a reduced diameter region which forms an annular groove 257 in the piston. The piston portion 256 functions to regulate the size of a port or orifice 258 leading to a line 259 connected to the rear pump line 240. The valve piston 253 rotates with the body 250 and is thrown radially outward from the center of rotation by centrifugal force. As the piston 253 moves outwardly, the port 258 is gradually uncovered to increase progressively the pressure of the fluid passing through the groove 257 to an outlet port 260 which is connected through a fluid passage 261 to the signal valves 183 and 184. This same fluid pressure is delivered through a line 262 to the lock-up clutch valve 181 for a purpose which will be described more fully hereinafter.

In similar manner, the piston 254 includes a relatively large diameter portion 263 and a somewhat smaller diameter portion 264 received within correspondingly dimensioned parts of the valve bore 252. The two portions 263 and 264 are interconnected by a reduced diameter region forming an annular groove 265 in the piston. The smaller diameter portion 264 regulates a variable orifice or port 266 connected through a fluid line 267 to the rear pump line 240 with the result that rotation of the body member 250 to move the piston 254 radially outward gradually uncovers the port 266 to connect the line 267 through the annular groove 265 to an outlet port 268. The port 268, in turn, delivers fluid through a passage 269 to the signal valves 185 and 186 referred to above.

Since the mass of the piston 253 is somewhat greater than that of the piston 254, it will begin to move radially outward at lower speeds and, hence, the port 258 is uncovered before the piston 254 begins its outward movement. Since the valve piston 253 is thrown radially outward by an amount which is dependent upon the speed of rotation of the body member 250, it will be observed that the pressure in the line 261 gradually increases in proportion to the speed of the output shaft 11 until the valve 253 has completed its outward movement. When the piston 253 has completed its outward movement, the fluid pressure delivered to the line 261 remains constant and the piston 254 begins its outward movement to increase gradually the pressure in the line 269. Here again, the pressure in the line 269 is a function of the vehicle speed. Since both of the governor valves are connected directly to the line 240, it will be apparent that the governor pressure supplied to the lines 261 and 269 will be present only when the vehicle is moving in a forward direction. When the valve piston 253 is fully retracted that is, when the output shaft 11 is not rotating, the line 261 is connected through the groove 257 to a vent port 270 and, in similar manner, when the piston 254 is fully retracted, the line 269 is connected through the annular groove 265 to a vent port 271.

LOCK-UP CLUTCH VALVE

When the vehicle attains sufficient forward speed to direct fluid pressure to the line 262, this fluid is admitted to a valve chamber 272 formed at the upper end of the lock-up clutch valve 181. This fluid pressure is also delivered through line 273 to the first and neutral inhibitor valve 188 to shift the latter in a manner which will be described more fully hereinafter. When the pressure of the fluid in the chamber 272 is sufficient to overcome a biasing spring 276, a valve piston 274 is moved downwardly within valve bore 275 to compress the spring. The valve piston 274 includes an annular groove 277 which, when the piston is moved downwardly, functions to connect the line 182 to a line 278 leading to the lock-up clutch 96. As previously indicated, the latter clutch may take any of the forms well known in this art and functions in response to the pressure in the line 278 to provide a direct connection from the engine shaft 10 to the input shaft 16, thus bypassing the torque converter 13 and avoiding the losses normally encountered by movement of fluid in the converter. The torque converter will thus be locked up as soon as the vehicle has reached a forward speed to develop a fluid pressure in the chamber 272 of sufficient value to overcome spring 276. The spring 276 may be designed to open the valve 181 at any predetermined vehicle speed but preferably this valve opens before the transmission shifts from its second speed ratio to its third speed ratio in the manner described below. Before the lock-up clutch 96 is applied, the valve piston 274 is in the position shown in FIG. 4 whereupon the line 278 is connected to a vent port 279 through the annular groove 277 in order to vent the lock-up clutch and prevent its application. The clutch 96 is released by the pressure in the torque converter 13 when the lock-up clutch valve 181 is closed to connect the line 278 to the vent port 279. A vent port 280 prevents fluid from being trapped behind the piston 274 to prevent its downward movement.

The valve piston 274 is of the differential area type having a piston portion 281 of somewhat larger diameter than a portion 282. As a consequence, after the valve piston 274 has been moved to a position permitting the flow of fluid from the line 182 to the line 278, the pressure acting upon the larger diameter piston portion 281 aids in holding the valve open. This feature also maintains the lock-up clutch engaged until the vehicle speed has been lowered somewhat below the speed originally required to engage the clutch.

MODULATOR VALVE

As previously described, the system is also effective to develop a second fluid pressure varying in accordance with the position of the throttle or accelerator. This fluid pressure is developed by the modulator valve 190 which includes a regulating valve piston 284 mounted within a valve bore 285. The piston 284 is provided with a peripheral groove 286 which serves to connect the line 191 with a fluid passage or line 287 leading to the signal valves 183, 184, 185 and 186. The piston 284 is adapted to control the size of a regulating port or orifice 288 so that the 100 p.s.i. pressure in the line 191 is reduced to a value which is a function of the position of the portion 294 on the end of a rod 293.

For the purpose of biasing the piston 284 toward the left end of the bore 285, a spring 289 is disposed within the valve bore and is positioned between the piston 284 and a second piston 290. The piston 290 is spaced from the piston 284 to define a valve chamber 291 which contains the spring 289 and also houses a kickdown rod 292 disposed concentrically within the spring. The piston 290 is connected through rod 293 and through suitable linkage connected to the end 294 of this rod to the accelerator pedal of the vehicle so that the normal range of movement of the accelerator results in application of force to the piston 284 through the spring 289. The force applied to the piston via the spring 289 acts against fluid pressure existing in a valve chamber 295 as a result of fluid supplied from the line 287 through a fluid passage 296. The valve 190 is so designed that movement of the accelerator or throttle through its normal range varies the pressure in the line 287 between 50 p.s.i. and full line pressure of 100 p.s.i. When the accelerator is fully depressed or is moved to what is customarily known as a kickdown position, the piston 290 engages the rod 292 and forces the valve piston 284 to the left as viewed in FIG. 4, thus completely uncovering the port 288 and admitting full line pressure to the line 287. In addition, when the manually operated selector valve 196 is in its hold position, fluid under pressure is delivered through a fluid line 295 to the valve chamber 291 in order to move the piston 284 to the left end of the bore 285, thus admitting full line pressure to the line 287 for a purpose which will be described more fully below.

SERVO REGULATOR VALVE

The servo regulator valve 194 regulates the pressure of the oil delivered to the servo devices controlling the various clutches and band brakes so that the holding ability of these servo devices is in proportion to the engine torque or throttle opening. By regulating the pressure in this manner, a smooth transition is achieved as the transmission shifts from one speed ratio to the next. To effect the described pressure regulation, the throttle controlled pressure in the line 287 is applied through a fluid passage 300 to a valve chamber 301 formed at the right side of the valve bore 302 for the servo regulator valve. A valve piston 303 of the differential area type having a relatively large diameter portion 304 and a somewhat smaller diameter portion 305 is positioned within the valve bore 302 which, of course, is stepped in diameter to accommodate the different portions of the piston. An annular groove 306 defined in the periphery of the piston serves to control the flow of fluid through the valve 194. More specifically, the 200 p.s.i. pressure in the line 193 is supplied to the valve bore 302 through an annular groove 307 which is adapted to be partially covered by the piston portion 305 to form a regulating port or opening 308. Thus, the fluid pressure existing in the space surrounding the groove 306 within the valve bore is equal to the 200 p.s.i. line pressure minus the pressure drop across the opening 308. This pressure acts upon the differential area between the piston portion 304 and the portion 305 to develop a force tending to move the valve piston 303 to the right as viewed in FIG. 4. The fluid pressure in the chamber 301 which, as previously described, varies from 50 p.s.i. to 100 p.s.i. in accordance with the movements of the accelerator or throttle of the vehicle tends to urge the piston 303 to the left against the action of the fluid pressure entering the valve bore through regulating port 308. Leftward movement of the piston 303 is limited in any suitable manner as, for example, by means of a stop pin 309. The areas of the piston portions 304 and 305 are preferably selected so that the pressure of the fluid delivered to the line 195 varies from 100 p.s.i. to 200 p.s.i. as the pressure in the chamber 301 varies from 50 p.s.i. to 100 p.s.i. Thus, the pressure in the line 195 is exactly double that in the lines 287 and 300.

The pressure in the line 195 is delivered through the system to the servo devices so that these devices receive a fluid pressure which is in proportion to the engine torque or throttle opening. During the shift from one speed ratio to another a relatively large volume of oil is required to fill the servo device or devices as rapidly as possible in order to prevent inordinate increase in the speed of the engine shaft 10. Such a large volume of oil increases the flow rate to cause a pressure drop in the system but this pressure drop reduces the force urging the piston 303 to the right so that the force of the fluid in the chamber 301 is effective to move the piston to the left in order to increase the size of the port 308, thus restoring the pressure in the line 195. Since the servo regulator valve 194 does not include a biasing spring all pressure drops in the system are accompanied by an unbalance in the forces acting upon the piston 303, so that any decrease in pressure causes movement of the piston towards its non-restricting position to allow the maximum flow of oil to meet the increased demand. The servo regulator valve 194, like the high range cushioner valve 205 described above, is characterized by a very rapid response and recovery to meet the changing pressure conditions in the system so that the likelihood of hunting in the system has again been reduced.

THE SIGNAL VALVES

The signal valves 183, 184, 185 and 186 receive the speed responsive fluid pressure from the governor device 241 which is opposed by the throttle position responsive fluid pressure from the line 287 and it is the function of these valves to respond to these two fluid pressures to control the automatic upshift or downshift as the speed of the vehicle and the position of the throttle permit. Since the throttle position responsive pressure in the line 287 is applied to the signal valves whenever the engine is running or whenever the vehicle is moving, it is unnecessary to use springs in the signal valves and, as a result, the attendant disadvantages with respect to the high cost of such springs and the precision necessary for satisfactory operation have been avoided.

Each of the signal valves includes two separate and distinct valve pistons one of which may be referred to as a governor signal piston and the other of which may be referred to as a pilot valve piston. The governor valve piston for the signal valve 183 is indicated by the reference numeral 310 while the pilot valve piston is designated by the reference numeral 311. Similarly, the governor valve pistons of the signal valves 184, 185 and 186 are respectively indicated by reference numerals 312, 313 and 314 while the pilot valve pistons of these same signal valves are designated as 315, 316 and 317. The pilot valves 311, 315, 316 and 317 are of identical construction and each includes a relatively large diameter portion and a somewhat smaller diameter portion interconnected by a reduced diameter section forming an annular groove. The large diameter portion of the valve 311 is indicated at 311a while the smaller diameter portion is indicated at 311b and the groove is indicated at 311c and a similar numbering arrangement has been employed for the remaining pilot valves 315, 316 and 317. The governor signal pistons 310 and 313 are identical in construction and are somewhat larger in diameter than the governor signal pistons 312 and 314 which are also identical to each other.

The throttle position responsive pressure in the line 287 is applied to valve chambers 318, 319, 320 and 321 formed at the left ends of the signal valves 183, 184, 185 and 186, respectively. The fluid pressure in the chambers 318, 319, 320 and 321 is effective to maintain both the pilot valve piston and the governor signal piston of each valve at the right side of their valve bore until the governor fluid pressure delivered from the governor device 241 is sufficient to overcome the pressure in these chambers. Thus, as the vehicle picks up speed and the fluid pressure in the line 261 increases, the force acting on the right side of the governor signal piston 310 becomes sufficient to overcome the fluid pressure in the chamber 318 to move both of the pistons 310 and 311 to the left as viewed in FIG. 4. It will be understood that, since the diameter of the piston 310 is somewhat larger than that of the piston 312, the signal valve 183 will operate before the valve 184. When the pistons 310 and 311 are moved to the left, the elongated groove 311c is effective to connect the line 187 to a fluid line 322 which is, in turn, connected through line 323 to a shuttle valve 324 controlling the operation of the band brake 79 and the clutch 82. The differential area between the piston portions 311a and 311b produces an additional force acting to move the pilot valve piston 311 to the left as soon as the line 187 is uncovered. Thus the pilot valve piston is moved quickly and positively from one position to the other to avoid a gradual increase in the pressure supplied to the control valves, another feature which prevents hunting in the system. In this connection it will be observed that hunting is prevented not only by the fact the pilot valves are very quickly moved from one position to the other in a positive manner but, in addition, because after the pilot valve pistons begin their travel they may be returned to the right only by an appreciable reduction in speed of the output shaft to lower the pressure from the governor device or by a sharp increase in the pressure supplied to the chambers 318, 319, 320 and 321.

After the pistons 310 and 311 have been moved to the left, the fluid pressure from the governor 241 will be sufficient to hold the pistons in this position as the vehicle continues to pick up speed to the point where the fluid pressure in the line 261 is sufficient to overcome that in the chamber 319 in order to move the pistons 312 and 315 to the left. Movement of the pilot valve piston 315 to the left causes the groove 315c to connect the line 322 to a fluid line 325. The fluid pressure in the line 325 is conencted through a passage 326 to a return valve 327 for the control valve 207 which operates band brake 81. The operation of the return valve 327 will be described more fully hereinafter.

If the vehicle continues to pick up speed, both of the signal valves 183 and 184 will remain in their open position and as soon as the point is reached where the fluid pressure in the line 269 is sufficient to overcome the pressure in the chamber 320, the valve pistons 313 and 316 are moved in unison to the left. Movement of the pilot valve piston 316 to the left establishes a connection from the line 325 to a fluid line 328 through the annular groove 316c. The line 328 is connected through a fluid line 329 to the return valve 327 referred to above. When the vehicle speed increases to a point where the fluid pressure in the line 269 acting upon the governor signal piston 314 is sufficient to overcome the fluid pressure in the chamber 321, the valve pistons 314 and 317 are moved in unison to the left so that all four of the signal valves 183, 184, 185 and 186 are, at this time, in their operative positions. Movement of the pilot valve piston 317 to the left connects the fluid line 328 through the groove 317c to a fluid passage 330 leading to the shuttle valve 324 referred to previously.

In view of the foregoing description, it will be observed that the signal valves 183, 184, 185 and 186 are effectively conected in series so that they receive fluid in progression, that is, the valve 184 cannot receive fluid until the valve 183 has been opened and the valve 185 cannot receive fluid until both of the valves 183 and 184 have opened. Similarly, the valve 186 cannot receive fluid through the line 328 until all three of the valves 183, 184, and 185 have been opened. Such an arrangement avoids disadvantages which might be caused by the pilot valves sticking in their energized positions.

THE CONTROL VALVES

The progressive operation of the signal valves 183, 184, 185 and 186 in the manner described above results in the sequential operation of the shuttle valve 324, the return valve 327, the control valve 207, the control valve 219 and another control valve 331. These control valves are of the two position type and are so connected in the fluid circuit that it is impossible to have a breakdown in operation caused by a sticking valve. The control valves 207 and 331 control the operation of the rear gear group 23 while the valve 219 controls the operation of the front gear group 22. All of these control valves are moved by the supply of constant pressure from the rear pump acting against non-critical valve return springs. All of the valves are of the snap action type to provide a positive control over the action of the servo devices applying the clutches and brakes in each speed ratio.

AUTOMATIC SHIFTING

The operation of the control valves will best be understood by considering the sequence of operation which takes place as the vehicle accelerates from a dead stop to the sixth speed ratio. Assuming first that the manually operated selector valve is placed in the drive position, it will be observed that fluid pressure in the line 195 is delivered through the annular groove 217 to a fluid passage 332 connected to the first and neutral inhibitor valve 188. The latter valve includes a piston 334 biased to the left by a spring 335. The piston 334 remains at the left end of the valve bore until the vehicle picks up speed to render the governor device effective to supply governor controlled fluid from the line 273 to a valve chamber 336 in the valve 188. With the piston 334 at the left, the fluid line 332 is connected through an annular groove 337 in the piston to a fluid line 338 leading to a valve chamber 339 formed at the left of the control valve 207. Thus, as soon as the selector valve is placed in the drive position, fluid under pressure is delivered to the chamber 339 to move the valve piston 340 to the right against the action of a biasing spring 341. When the valve piston 340 is moved to the right, a land 342 on this position seats against the valve bore at the region indicated by the reference numeral 343 to interrupt the circuit between the fluid line 206 and the fluid passage 208. At the same time, an annular groove 344 formed in the piston connects the line 208 to a vent port 345 so that the lower end of the cylinder 210 for the band brake 81 is vented and, as a consequence, the biasing spring 213 is rendered effective to move the piston 211 downwardly to disengage this band brake.

Movement of the piston 340 to the right also connects the line 206 through an annular groove 346 in the piston to a fluid line 347. The latter line is connected through the valve 331 and through line 348 to a servo device 349 controlling the operation of the band brake 79. More specifically, the line 348 delivers fluid under pressure to the lower end of a cylinder 350 which houses a piston 351 connected through suitable linkage to the band brake 79. A biasing spring 352 normally urges the piston 351 toward the bottom of the cylinder 350. The application of fluid under pressure from the line 348 to the lower end of the cylinder 350, of course, moves the piston 351 upwardly to compress the spring 352 and apply the band brake 79.

With the selector valve in the "drive" position, the fluid in line 195 is delivered through the groove 217, through the line 218, through the valve 219 and through line 220 to the clutch chamber 42 in order to apply the clutch 43. With the clutch 43 and the band brake 79 applied, the transmission is immediately placed in the second forward speed ratio. Thus, it will be observed that when the manually operated selector valve 196 is moved from the neutral position directly to the drive position, the second speed ratio is immediately established. As long as the selector valve 196 remains in "drive" position the transmission cannot downshift to the first forward speed ratio or to neutral since the first and neutral inhibitor valve 188 maintains the fluid flow to chamber 339 to prevent either of these drives from being established.

SECOND TO THIRD SHIFT

When the second speed ratio is established as described above, the vehicle begins its forward movement and when a speed is reached to develop governor controlled pressure in the line 261 of sufficient value to move the pistons 310 and 311 of the signal valve 183 to the left, the rear pump pressure in the line 187 is connected to the lines 322 and 323. The fluid in the line 323 is delivered through the shuttle valve 324 and through a fluid passage 354 to a valve chamber 355 formed at the left side of the control valve 331. The fluid pressure in the chamber 355 is effective to move a valve piston 356 to the right to compress spring 357. Movement of the valve piston 355 to the right connects the fluid line 348 through an annular groove 358 to a vent port 359, thus permitting the biasing spring 352 to move the piston 351 to the bottom of the cylinder 350 in order to disengage the band brake 79. At the same time, a land 360 formed on the piston 356 cooperates with the valve bore 361 to break the fluid connection between the line 347 and the line 348.

Movement of the piston 355 to the right also connects the line 347 to a fluid passage 362 leading to chamber 86 of the clutch 82. When fluid under pressure is delivered to the chamber 86, the piston 85 is rendered effective to move the clutch plates into engagement to apply the clutch 82 so that the ring gears 70 and 76 of the output gear group 23 are connected together to establish a direct drive through the output gear group.

At this time, the clutch 43 remains applied since the fluid connection to the line 220 is not disturbed. With the clutch 43 and the clutch 82 applied the third speed ratio is established as described above.

At this point, it should also be observed that as soon as the governor device 241 is rendered effective to supply fluid under pressure to the lines 262 and 273, the chamber 336 to the left side of the reverse and neutral inhibitor valve 188 is supplied with fluid under pressure which is effective to move the valve piston 334 to the right as viewed in FIG. 4 against the action of the spring 335. When the piston 334 is moved to the right the fluid connection from the line 332 to the line 338 is broken but, at the same time, the rear pump pressure in the line 189 is delivered through line 338 to the clutch chamber 339 so that the piston 340 is maintained at the right of its valve bore. As indicated above, this prevents a downshift to the first speed ratio by blocking the fluid flow to the line 208 as long as the manually operated selector valve 196 remains in the drive position.

THIRD TO FOURTH SHIFT

As the vehicle continues to accelerate, the valve pistons 312 and 315 are moved to the left in the manner described above to supply fluid from the line 322 to the lines 325 and 326. The fluid flow in the line 326 passes through the return valve 327 and through a fluid passage 364 to a valve chamber 365 formed at the left side of the shuttle valve 324. The fluid pressure in the chamber 365 is effective to move a valve piston 366 to the right against a spring 367 until the piston is seated against a fixed stop 268. When the piston 366 is moved to the right, the fluid flow from the line 323 to the line 354 is interrupted and, at the same time, the line 354 is connected through an annular groove 369 in the piston 366 to the line 330 which, at this time, is connected through the annular groove 317c in the pilot valve piston 317 to a vent port 370. Thus, the chamber 355 is vented and the biasing spring 357 becomes effective to return the piston 356 to the left. When the piston 356 is returned to the left, the fluid line 362 is connected through an annular groove 371 to a vent port 363 so that the clutch 82 is disengaged by the biasing springs acting upon its piston 85. Movement of the piston 356 to the left also breaks the connection from the line 347 to the line 362 and instead connects the fluid line 347 to the line 348. However, the band brake 79 is not applied because of the action taking place at the control valve 207. More specifically, the fluid pressure in the line 326 also passes through the return valve 327 and through a fluid passage 373 to a valve chamber formed at the right of the valve 207. Thus, the fluid pressures acting upon opposed ends of the valve piston 340 are balanced and, as a consequence, the spring 341 is effective to move the piston 340 to the left to break the connection between the line 206 and the line 347. This prevents application of the band brake 79 and, at the same time, connects the line 206 through annular groove 344 to the line 208 in order to supply fluid under pressure to the lower end of the cylinder 210 for the purpose of applying the band brake 81 in the manner described above. Application of band brake 81 establishes major speed reduction in the gear group 23.

The fluid pressure in the line 364 is delivered through the chamber 365 and through a fluid passage 374 to a valve chamber 375 formed at the left side of the control valve 219. The fluid pressure in the chamber 375 is effective to move a valve piston 376 to the right to compress a spring 377. Movement of the piston 376 to the right connects the line 220 through an annular groove 378 to a vent port 379. At the same time, a land 380 on the piston 386 cooperates with a portion 381 of the valve bore to break the connection from the line 218 to the line 220. With the clutch chamber 42 vented, the biasing springs of the clutch 43 are effective to move the piston 46 to the right in order to disengage the clutch plates.

Movement of the piston 376 to the right, however, establishes a connection from line 218 through an annular groove 382 to line 383 leading to the chamber 39 of the clutch 37. Application of fluid under pressure to the chamber 39, of course, engages the plates of the clutch 37 to lock up the input gear group 22 for direct drive. With the clutch 37 and the band brake 81 applied, the transmission is in its fourth speed ratio. As previously indicated, when the line 220 is vented, the delivery of fluid under pressure to the line 221 to the chamber 222 ceases and, as a result, the high range cushioner valve 205 begins to perform its pressure regulating function.

FOURTH TO FIFTH SHIFT

As the vehicle picks up further speed, the valve pistons 313 and 316 are moved to the left to connect the line 325 to the lines 328 and 329. The line 329 is connected to a valve chamber 385 formed at the left of the return valve 327. When fluid under pressure is admitted to the chamber 385 a valve piston 386 is moved to the right against the action of spring 387 until this piston is seated upon a fixed stop 388. Movement of the piston 386 to the right breaks the connection from the line 326 to the line 373 and, at the same time, connects the line 373 through an annular groove 389 to a vent port 390. With the line 373 vented, the fluid pressure in the chamber 339 is again effective to overcome the spring 341 in order to move the valve piston 340 to the right. When the piston 340 is moved to the right, the land 342 cooperates with the bore region 343 to break the fluid connection from the line 206 to the line 208 and, at the same time, to vent the line 208 through the annular groove 344 to the vent port 345. Biasing spring 213 of the servo device 209 thus moves the piston 211 to the bottom of the cylinder 210 to disengage the band brake 81. Movement of the piston 340 to the right also establishes a connection from the line 206 through the annular groove 346 to the fluid line 347 through the valve 355 and through the fluid line 348 to the servo device 349 in order to apply the band brake 79. The fluid in the line 326 flows around the valve piston 386 through the line 364 through the chamber 365 and through the line 374 to the valve chamber 375 in order to maintain the piston 376 at the right of its valve bore so that the clutch 37 remains applied. With the clutch 37 and the band brake 79 both applied, the transmission is in its fifth speed ratio.

FIFTH TO SIXTH SHIFT

As the vehicle continues to pick up speed the pistons 314 and 317 are moved to the left in the manner previously described to connect the line 328 to the line 330. Movement of the pilot valve piston 317 to the left, of course, breaks the connection from the line 330 to the vent port 370. The fluid pressure in the line 330 is delivered through the annular groove 369 in the piston 366 to the line 354 in order to supply pressure to the chamber 355 for moving the valve piston 356 to the right. When the valve piston 356 is moved to the right, the line 348 is disconnected from the line 347 and is instead connected through the annular groove 358 to the vent port 359 so that the servo device 349 is rendered effective to disengage the band brake 79. Movement of the piston 356 to the right also connects the line 347 through annular groove 371 to the fluid line 362 in order to apply the clutch 82. The fluid pressure in the line 374 continues to maintain the valve piston 376 of the control valve 219 in its right hand position so that the clutch 37 remains applied. With the clutches 37 and 82 both applied, the two gear groups 22 and 23 are both locked up for direct drive and, as a consequence, the sixth speed ratio or the direct drive connection between the engine shaft 10 and the output shaft 11 is established.

DOWNSHIFT

As the vehicle speed decreases or as the throttle position changes to alter the conditions existing at the signal valves 183, 184, 185 and 186, the transmission will downshift from the sixth speed ratio in a manner which will be obvious in view of the foregoing description. The speed ratio established will, at all times, correspond to that which is proper for the existing vehicle speed and throttle position.

AUTOMATIC SHIFT FROM FIRST

If the forward movement of the vehicle is initiated by placing the manually operated selector valve 196 in its "first" position, the band brake 81 and clutch 43 are immediately applied in the manner described above, thus establishing the first speed ratio or low drive. This ratio is particularly useful for difficult starts and is bypassed under normal conditions by placing the selector valve in its "drive" position. With the selector valve in the "first" position, however, no fluid flows to the line 332. When the vehicle is started, there is no pressure in line 273 and the biasing spring 335 of the first and neutral inhibitor valve 188 holds the piston 334 at the left of its valve bore. The line 332 is at this time connected to vent through the left end of the valve 196 and, as a result, the chamber 339 is vented through line 338 and groove 337. The biasing spring 341 holds the piston 340 at the left of its valve bore to direct fluid to the servo device 209 for applying the band brake 81. Clutch 43 is applied by the fluid flowing through line 218, through valve 219 and through line 220. The vehicle thus begins its forward movement in the first speed ratio and as it picks up speed the governor pressure developed in the line 273 in the manner previously described becomes sufficient to overcome the biasing spring 335 and move the piston 334 of the inhibitor valve 188 to the right. When the piston 334 moves to the right, the fluid in line 189 is supplied through the annular groove 337 and through line 338 to the chamber 339 of the control valve 207, thus shifting the piston 340 to the right in order to cut off the fluid flow from line 206 to the servo device 209. Movement of the piston 340 to the right vents the lower end of cylinder 210 through port 345 and groove 344 and, hence, permits the spring 213 to move the piston 211 downwardly to disengage the band brake 81. At the same time, fluid from line 206 is supplied through the groove 346, through the control valve 331 and through line 348 to the servo device 349 in order to apply the band brake 79. The clutch 43 remains applied since the fluid flow continues through line 218, through the control valve 219 and through line 220 to the chamber 42. With the clutch 43 and the band brake 79 applied the second forward speed ratio is established. The transmission will then be upshifted in steps from the second ratio and downshifted again as the vehicle speed and acceleration position dictate in exactly the same manner as described above. Thus, with the selector valve in "first" position, the transmission automatically shifts from first to sixth speed ratios without further movement of the selector valve.

MODIFICATION FOR DIFFERENT VEHICLES

By changing the diameters of the governor signal pistons 310, 312, 313 and 314, different shift points can be obtained and, as a consequence, the whole control system may be designed to work with an engine of given size merely by changing the diameters of the governor signal valve pistons. These particular valves are contained in a separate housing and, hence, are readily accessible so that the mating of the shift speeds to engine speed may be accomplished readily and at a minimum cost.

KICKDOWN

The operator may fully depress the accelerator pedal in what is generally termed a kickdown operation to supply full pressure from line 191 to the valve chambers 318, 319, 320 and 321. It will be recalled that until the accelerator pedal is fully depressed, the valve piston 284 functions as a pressure regulator to limit the pressure applied to the valve chambers 318, 319, 320 and 321 to a value somewhat below that of the rear pump system pressure. Full depression of the accelerator pedal forces the piston 290 into engagement with the rod 292 which, in turn, engages the piston 284 and moves it to the left end of the valve bore 285, thereby completely uncovering the regulating port 288 and admitting full pressure from line 191 through line 287 to the valve chambers 318, 319, 320 and 321. The application of full line pressure to the chambers 318, 319, 320 and 321 causes the signal valve immediately below the then existing speed ratio to shift to its off position if the output shaft 11 is at that time rotating at a speed which would permit a downshift. When the pilot valve is moved to its off position, the transmission shifts down one step to increase the torque available to the output shaft 11.

HOLD POSITION

As previously indicated, the manually operated selector valve 196 may be moved to the "hold" position whenever it is desired to prevent the transmission from upshifting at off throttle conditions as, for example, might be the case when descending hills or under other conditions where high engine speeds are desired. When the selector valve 196 is moved to the "hold" position, fluid under pressure from the line 195 is delivered through the annular groove 217 and through the line 295 to the valve chamber 291 thus moving the piston 284 to the left to uncover the regulating port 288 and to supply full line pressure to the valve chambers 318, 319, 320 and 321. This prevents the signal valves 183, 184, 185 and 186 from shifting to a higher or lower speed ratio at conditions other than full engine speeds.

A mechanical linkage, not shown, is also connected between the end 294 of the modulator valve piston and the end 145 of the hydrodynamic brake valve so that the modulator valve piston 284 is moved to the extreme left whenever the hydrodynamic brake is applied. Movement of the piston 284 to the extreme left again supplies full line pressure to the valve chambers 318, 319, 320 and 321 to prevent the transmission from shifting except at full engine speed conditions. At the same time, the full line pressure passed by the valve 190 is admitted through line 300 to the chamber 301 so that the servo regulator valve piston is moved against the stop 309 to uncover completely the regulating port 308 whereupon the full front pump pressure is delivered from the line 193 to the line 195. Thus, when the hydrodynamic brake is applied, full 100 p.s.i. pressure of the line 191 is applied to the signal valves of the system to increase the speed at which the shift points occur in order to increase the sufficiency of the hydrodynamic brake and, at the same time, increased pressure from the front pump is applied to the servo devices to prevent slipping of the applied friction elements under load.

STARTING WITH A DEAD ENGINE

If the vehicle is towed or pushed with a dead engine, the rear pump 93 supplies oil through the rear pump system regulator valve 171 and through line 118 to the servo regulator valve 194 and to the front pump 92. Since the pressure of the oil under these conditions cannot exceed 100 p.s.i., the biasing spring 140 of the hydrodynamic brake and heat exchanger limit valve 135 (FIG. 3) maintains the valve piston 138 at the right of the valve bore 139 to prevent the flow of fluid to the hydrodynamic brake 20 and to the heat exchanger 137. As soon as the torque converter 13 has been charged and the servo devices for either the first or second speed ratio have been engaged, power is transmitted from the vehicle wheels through the transmission to turn the engine for the purpose of starting it.

In view of the foregoing description, it is belived that the operation of the control system described will be readily apparent and it will be observed that the enumerated objects of the invention have all been accomplished in the manner pointed out in detail above.

While a particular embodiment of the invention has been descirbed and illustrated, it will be apparent that many modifications will readily occur to those skilled in this art and it is, therefore, contemplated by the appended claims to cover any such modifications as fall within the true spirit and scope of the present invention.

What is claimed as new and desired to be secured by Letters Patent of the United States is:

1. In an accelerator controlled multiple speed vehicle transmission of the type employing change speed gearing connected between an input shaft and an output shaft together with a plurality of fluid operated friction devices operable to cooperate with the change speed gearing in establishing at least one relatively high forward speed ratio, at least one relatively low forward speed ratio and a reverse drive between said shafts, the combination of
   (a) a first fluid pump for delivering pressurized fluid,
   (b) a second fluid pump for delivering pressurized fluid,
   (c) a modulator valve connected to receive fluid from said pumps and responsive to the vehicle accelerator to provide an accelerator controlled fluid pressure varying in accordance with the accelerator position,
   (d) governor controlled valving connected to receive pressurized fluid from the said second pump only and responsive to the rotational speed of the output shaft to provide a fluid pressure varying in accordance with the rotational speed of the output shaft,
   (e) a servo regulator valve responsive to the said accelerator controlled fluid pressure and connected in circuit with the said first pump to receive pressurized fluid therefrom and provide a servo fluid pressure varying in accordance with the accelerator position,
   (f) a plurality of valves connected in circuit with the fluid operated friction devices for controlling the delivery of pressurized fluid from the said first pump only to the fluid operated friction devices and including
      I. a manually operable selector valve subject to servo fluid pressure connected in circuit with the said servo regulator valve and movable between a reverse position and at least one forward position and
      II. a pressure regulation cushioning valve subject to servo fluid pressure connected in circuit with the said servo regulator valve and the fluid operated friction devices and movable between a non-regulating position wherein full servo fluid pressure output is applied to the fluid operated friction devices and a regulating position wherein a reduced servo fluid pressure output is applied,
   (g) valving connected in circuit with said plurality of valves and responsive to the said acelerator controlled fluid pressure and the said governor controlled fluid pressure for automatically upshifting and downshifting the change speed gearing between said relatively low and high speed ratios,
   (h) means connecting said selector valve and said cushioning valve for providing servo fluid pressure to said cushioning valve from said selector valve when said selector valve is in reverse position so that said cushioning valve is moved to its non-regulating position in order to deliver full servo fluid pressure in reverse drive, and
   (i) means for providing the servo fluid pressure to said cushioning valve in order to move the latter to its non-regulating position when the plurality of valves is effective to establish said relatively low speed ratio so that full servo fluid pressure output is delivered from the cushioning valve when the relatively low speed ratio is established.

2. The apparatus defined by claim 1 wherein the cushioning valve includes a piston of the differential area type having a relatively small diameter portion and a relatively large diameter portion both of which portions are exposed to the servo fluid pressure when the cushioning valve is in its regulating position in order to develop a first force urging the piston towards its non-regulating position, and means for delivering a portion of the output of the cushioning valve to act upon said piston to develop a second force opposing said first force when the cushioning valve is in its regulating position.

3. The apparatus defined by claim 1 wherein the servo regulator valve includes a piston of the differential area type having a relatively large diameter portion and a somewhat smaller diameter portion both of which portions are exposed to pressurized fluid from the first pump to develop a force acting in opposition to the accelerator controlled pressure, said servo regulator valve including at least one pressure regulating port varied by said piston for reducing the pressure of the pressurized fluid delivered from the first pump in order to develop said servo fluid pressure.

4. The apparatus defined by claim 2 wherein the servo regulator valve includes a valve plunger of the differential area type having different diameter portions exposed to pressurized fluid from the first pump to develop a force acting in opposition to the accelerator controlled pressure, said servo regulator valve including at least one pressure regulating port varied by said plunger for reducing the pressure of the pressurized fluid delivered from the first pump in order to develop said servo fluid pressure.

5. In an accelerator controlled multiple speed vehicle transmission of the type employing change speed gearing between an input shaft and an output shaft together with a plurality of fluid operated friction devices operable to cooperate with the change speed gearing in establishing at least one relatively high forward speed ratio and at least one relatively low forward speed ratio between said shafts, the combination of (a) a first fluid pump for delivering pressure fluid,
(b) a second fluid pump for delivering pressure fluid,
(c) means connected to receive pressure fluid from the said first or second pump and responsive to at least one vehicle condition other than speed to provide a first fluid pressure,
(d) governor controlled means connected to receive pressure fluid from the said second pump only and responsive to the speed of rotation of the output shaft to provide a second fluid pressure varying in accordance with the speed of rotation of the output shaft,
(e) a servo regulator valve responsive to the said first fluid pressure and connected in circuit with the said first fluid pump to receive pressure fluid therefrom and provide a servo fluid pressure varying in accordance with the said one vehicle condition,
(f) a plurality of valves connected in circuit with the fluid operated friction devices for controlling the delivery of pressure fluid from the said first pump only to the fluid operated friction devices and including
  I. a pressure regulating cushioning valve connected to receive the said servo fluid pressure and movable between a non-regulating position wherein full servo fluid pressure output is applied to the fluid operated friction devices and a regulating position wherein a reduced servo fluid pressure output is applied,
(g) valving connected in circuit with said plurality of valves and responsive to the said first and second fluid pressures for automatically upshifting and downshifting the change speed gearing between said relatively low and high speed ratios, and
(h) means for providing fluid pressure to said cushioning valve in order to move the latter to its non-regulating position when the plurality of valves is effective to establish said relatively low speed ratio so that full servo fluid pressure output is delivered from the cushioning valve when the relatively low speed ratio is established.

6. The apparatus defined by claim 5 wherein the cushioning valve includes a piston of the differential area type having a relatively small diameter portion and a relatively large diameter portion both of which portions are exposed to the servo fluid pressure when the cushioning valve is in its regulating position in order to develop a first force urging the piston towards its non-regulating position, and means for delivering a portion of the output of the cushioning valve to act upon said piston to develop a second force opposing said first force when the cushioning valve is in its regulating position.

7. The apparatus defined by claim 5 wherein the servo regulator valve includes a piston of the differential area type having a relatively large diameter portion and a somewhat smaller diameter portion both of which portions are exposed to the pressure fluid from the first pump to develop a force acting in opposition to the accelerator controlled pressure, said servo regulator valve including at least one pressure regulating port varied by said piston for reducing the fluid pressure delivered from the supply means in order to develop said servo fluid pressure.

8. In an accelerator controlled multiple speed vehicle transmission of the type employing change speed gearing connected between an input shaft and an output shaft together with a plurality of fluid operated friction devices operable to cooperate with the change speed gearing and establishing at least one relatively high forward speed ratio, at least one relatively low forward speed ratio and a reverse drive between said shafts, the combination of (a) a first fluid pump for delivering pressure fluid,
(b) a second fluid pump for delivering pressure fluid,
(c) means connected to receive pressure fluid from the said first or second pump and responsive to at least one vehicle condition other than speed to provide a first fluid pressure,
(d) governor controlled means connected to receive pressure fluid from the said second pump only and responsive to the speed rotation of the output shaft to provide a second fluid pressure varying in accordance with the speed of rotation of the output shaft,
(e) a servo regulator valve responsive to the said first fluid pressure and connected in circuit with the said first pump to receive pressure fluid therefrom and provide a servo fluid pressure varying in accordance with the said one vehicle condition,
(f) a plurality of valves connected in circuit with the fluid operated friction devices for controlling the delivery of pressure fluid from the said first pump only to the fluid operated friction devices and including
  I. a manually operable selector valve subject to servo fluid pressure connected in circuit with the said servo regulator valve and movable between a reverse position and at least one forward position and
  II. a pressure regulating cushioning valve subject to servo fluid pressure connected in circuit with the said servo regulator valve and the fluid operated friction devices and movable between a non-regulating position wherein full servo fluid pressure output is applied to the fluid operated friction devices and a regulating position wherein a reduced servo fluid pressure output is applied,
(g) valving connected in circuit with said plurality of valves and responsive to the said first and second fluid pressures automatically upshifting and downshifting the change speed gearing between said relatively low and high speed ratios,
(h) means connecting said selector valve and said cushioning valve for providing servo fluid pressure to said cushioning valve from said selector valve when said selector valve is in reverse position so that said cushioning valve is moved to its non-regulating position in order to deliver full servo fluid pressure in reverse drive, and
(i) means for providing the servo fluid pressure to said cushioning valve in order to move the latter to its non-regulating position when the plurality of valves is effective to establish said relatively low speed ratio so that full fluid pressure output is delivered from the cushioning valve when the relatively low speed ratio is established.

References Cited in the file of this patent

UNITED STATES PATENTS

| | | |
|---|---|---|
| 2,640,373 | Jandasek | June 2, 1953 |
| 2,713,800 | Forster | July 26, 1955 |
| 2,770,148 | Wayman | Nov. 13, 1956 |
| 2,831,493 | Richmond | Apr. 22, 1958 |
| 2,875,643 | Kelley | Mar. 3, 1959 |
| 2,919,597 | Borman | Jan. 5, 1960 |
| 2,926,543 | Holdeman et al. | Mar. 1, 1960 |
| 2,936,653 | Quistgaard et al. | May 17, 1960 |
| 3,004,446 | Flinn | Aug. 17, 1961 |
| 3,025,723 | Miller | Mar. 20, 1962 |